United States Patent
Hua et al.

(10) Patent No.: US 7,768,907 B2
(45) Date of Patent: Aug. 3, 2010

(54) SYSTEM AND METHOD FOR IMPROVED ETHERNET LOAD BALANCING

(75) Inventors: Binh K. Hua, Austin, TX (US); Ron E. Gonzalez, Austin, TX (US); Sivarama K. Kodukula, Round Rock, TX (US); Rakesh Sharma, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 527 days.

(21) Appl. No.: 11/738,596

(22) Filed: Apr. 23, 2007

(65) Prior Publication Data

US 2008/0259917 A1    Oct. 23, 2008

(51) Int. Cl.
*G01R 31/08* (2006.01)
*H04J 3/16* (2006.01)
*G06F 5/16* (2006.01)
*G06F 15/173* (2006.01)
*G06F 9/46* (2006.01)

(52) U.S. Cl. .............. 370/218; 370/252; 370/465; 709/229; 709/238; 718/105

(58) Field of Classification Search .......... 370/217, 370/218, 225, 228, 242, 252, 465, 431; 709/229, 709/224, 226, 238; 718/105

See application file for complete search history.

(56) References Cited

U.S. PATENT DOCUMENTS

| | | | |
|---|---|---|---|
| 4,621,359 A | 11/1986 | McMillen | |
| 5,862,338 A | 1/1999 | Walker et al. | |
| 5,918,021 A * | 6/1999 | Aditya | 709/235 |
| 5,991,295 A | 11/1999 | Tout et al. | |
| 6,421,359 B1 | 7/2002 | Bennett et al. | |
| 6,456,597 B1 * | 9/2002 | Bare | 370/252 |
| 6,473,424 B1 * | 10/2002 | DeJager et al. | 370/389 |
| 6,938,092 B2 | 8/2005 | Burns | |
| 6,992,980 B2 | 1/2006 | Brezzo et al. | |
| 7,058,065 B2 | 6/2006 | Musoll et al. | |
| 7,190,695 B2 * | 3/2007 | Schaub et al. | 370/392 |
| 7,506,074 B2 * | 3/2009 | Venkatanarayan et al. | 709/250 |
| 2003/0214945 A1 * | 11/2003 | Kawamura | 370/389 |
| 2006/0039276 A1 | 2/2006 | Jain et al. | |
| 2006/0077950 A1 | 4/2006 | Gallagher et al. | |

* cited by examiner

*Primary Examiner*—Nittaya Juntima
(74) *Attorney, Agent, or Firm*—Patrick E. Caldwell, Esq.; The Caldwell Firm, LLC

(57) ABSTRACT

A method for Ethernet packet load balancing includes receiving a transmit packet for transmission on an Ethernet network. An offload adapter identifies a least busy port from a plurality of ports indicated in a port list, based on a byte count associated with each of the plurality of ports. The offload adapter determines whether the identified least busy port is in a working status. In the event an identified least busy port is in a working status, the offload adapter assigns the transmit packet to the identified least busy port and increments the byte count associated with the identified least busy port. In the event an identified least busy port is not in a working status, the offload adapter updates the port list and, based on a determination that there are additional working ports, assigns the transmit packet to one of the additional working ports.

20 Claims, 3 Drawing Sheets (PRIOR ART)

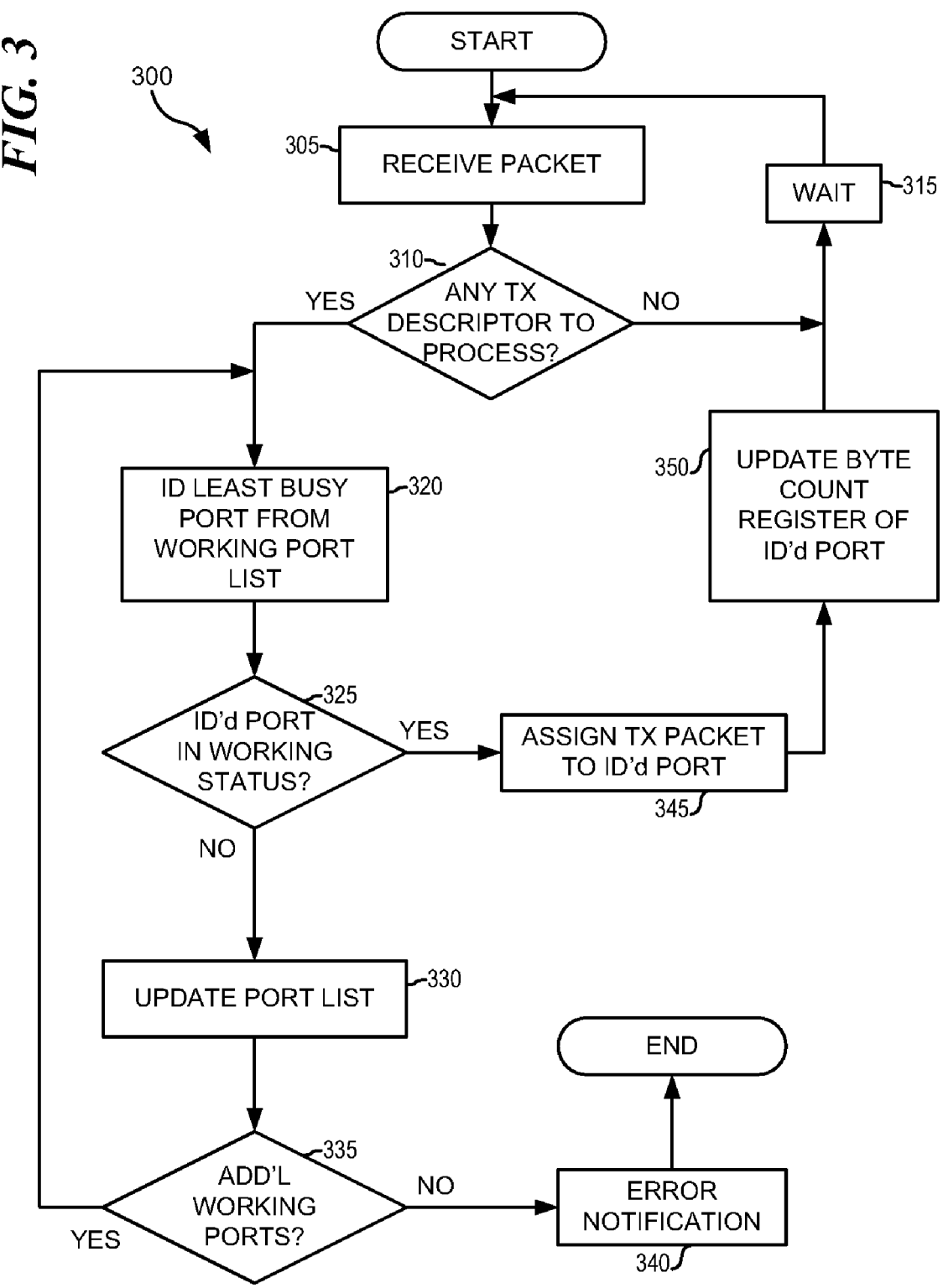

US 7,768,907 B2

SYSTEM AND METHOD FOR IMPROVED ETHERNET LOAD BALANCING

TECHNICAL FIELD

The present invention relates generally to the field of computer networking and parallel processing and, more particularly, to a system and method for improved Ethernet adapter load balancing.

BACKGROUND OF THE INVENTION

Modern electronic computing systems, such as microprocessor systems, are often organized as networks of discrete devices, which require interconnection and intercommunication. Networking demands are increasing rapidly, somewhat independent of hardware advances, and therefore frequently exceed the capacity of many network devices. For example, bandwidth-intensive applications such as online content, e-commerce, large databases, and streaming media require significantly more network bandwidth than conventional textual data. In fact, some of the most widely-used one-Gigabit Ethernet network adapters do not meet the network bandwidth demand in some bandwidth-intensive environments.

The industry developed the EtherChannel and IEEE 803.3ad technologies to address these bandwidth-intensive business needs. FIG. 1 illustrates a typical configuration, shown as system 100. Generally, EtherChannel/803.3ad groups multiple Ethernet network adapters together to form a single larger pipe, as shown in FIG. 1. For instance, four 1-Gbit Ethernet adapters can be combined in a server to form a single 4-Gbit network interface using one IP address.

More specifically, application (or application layer) 102 transmits an addressed packet to TCP/IP layer interface 104, of socket 106. TCP/IP interface 104 passes the addressed packet to EtherChannel driver 110, which selects one of the several available Ethernet "ports," and passes the addressed packet to the selected port's Ethernet driver 120. The Ethernet driver 120 processes and forwards the received packet to its associated Ethernet adapter 122. System 100 includes four conventional Ethernet drivers 120 and four associated conventional Ethernet adapters 122. Generally, EtherChannel driver 110 groups the four ports together to form a single pipe, with the bandwidth of all four ports combined.

The EtherChannel model typically comprises mostly software load balancing functionality, illustrated in FIG. 1 as EtherChannel driver 110, and runs from a processor on the Ethernet server. Specifically, in one configuration, the EtherChannel "port aggregation" software evenly allocates the data packets among available adapters in a round-robin fashion. In another configuration, the EtherChannel software allocates the data packets based on a hash function of part of the packets' addresses. The EtherChannel model provides adequate performance, but suffers from some significant limitations.

First, EtherChannel requires additional software not necessary in standard Ethernet configurations. This additional software adds some latency. Second, the EtherChannel software is typically configured under an N-to-1 receive and 1-to-N transmit model, where "N" is the number of ports. In multiple-CPU environments, software locking can be a scaling issue when the number of ports in the EtherChannel increases.

Third, EtherChannel systems experience a longer delay for error indications to arrive from the Ethernet adapter hardware. That is, the EtherChannel driver 110 will occasionally transmit data to a particular port, while that port is down or otherwise malfunctioning. The EtherChannel driver 110 must wait for the data packet to "bounce" before reallocating the data stream among the remaining ports. The delay in error detection and notification can cause more data to be dropped.

Fourth, the typical "Kernel Interrupt" function is ordinarily a single-threaded function. As such, the interrupt generated by the last port or a down port experiences longer latency for servicing, which causes additional bandwidth reduction.

Fifth, under standard EtherChannel configurations, interrupt servicing typically requires context switching for each interrupt between the ports. This context switching adds CPU cycles, and therefore latencies, which also reduce available effective bandwidth.

Therefore, there is a need for a system and/or method for Ethernet load balancing that addresses at least some of the problems and disadvantages associated with conventional systems and methods.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved Ethernet adapter load balancing method.

It is a further aspect of the present invention to provide for an improved Ethernet adapter load balancing system.

It is a further aspect of the present invention to provide for an improved EtherChannel packet distribution system.

It is a further aspect of the present invention to provide for an improved EtherChannel packet distribution method.

The aforementioned aspects and other objectives and advantages can now be achieved as described herein. A method for Ethernet packet load balancing includes receiving a transmit packet for transmission on an Ethernet network. An offload adapter identifies a least busy port from a plurality of ports indicated in a port list, based on a byte count associated with each of the plurality of ports. The offload adapter determines whether the identified least busy port is in a working status. In the event an identified least busy port is in a working status, the offload adapter assigns the transmit packet to the identified least busy port and increments the byte count associated with the identified least busy port. In the event an identified least busy port is not in a working status, the offload adapter updates the port list and, based on a determination that there are additional working ports, assigns the transmit packet to one of the additional working ports.

In an alternate embodiment, a system for Ethernet load balancing includes a bus interface configured to couple to a device driver and to receive transmit packets for transmission over an Ethernet network. A descriptor processor direct memory access (DMA) scheduler (DPDS) couples to the bus interface and comprises a port list. A plurality of Ethernet ports couple to the DPDS. Each Ethernet port comprises a status register indicating a "working" or "not working" status for the associated port; and a byte count register indicating a byte count for the associated port. The DPDS assigns received transmit packages to a least busy port of the plurality of ports for transmission based the port list and the byte count of the associated ports.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

FIG. 3 illustrates a high-level flow diagram depicting logical operational steps of an improved Ethernet load balancing method, which can be implemented in accordance with a preferred embodiment.

DETAILED DESCRIPTION

Figure 1:
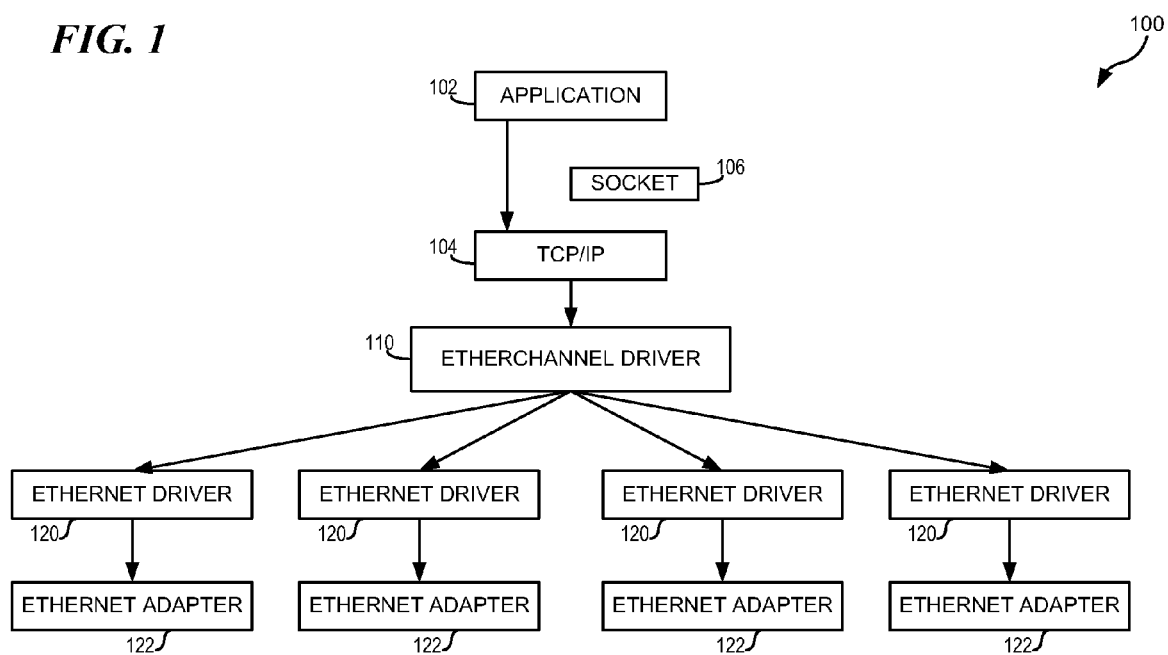
FIG. 1 illustrates a block diagram showing a common EtherChannel interface model in accordance with the Prior Art.

The particular values and configurations discussed in these non-limiting examples can be varied and are cited merely to illustrate at least one embodiment and are not intended to limit the scope of the invention.

In the following discussion, numerous specific details are set forth to provide a thorough understanding of the present invention. Those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, user interface or input/output techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or in some combinations thereof. In a preferred embodiment, however, the functions are performed by a processor such as a computer or an electronic data processor in accordance with code such as computer program code, software, and/or integrated circuits that are coded to perform such functions, unless indicated otherwise.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus or otherwise tangible medium that can contain and store the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

Figure 2:
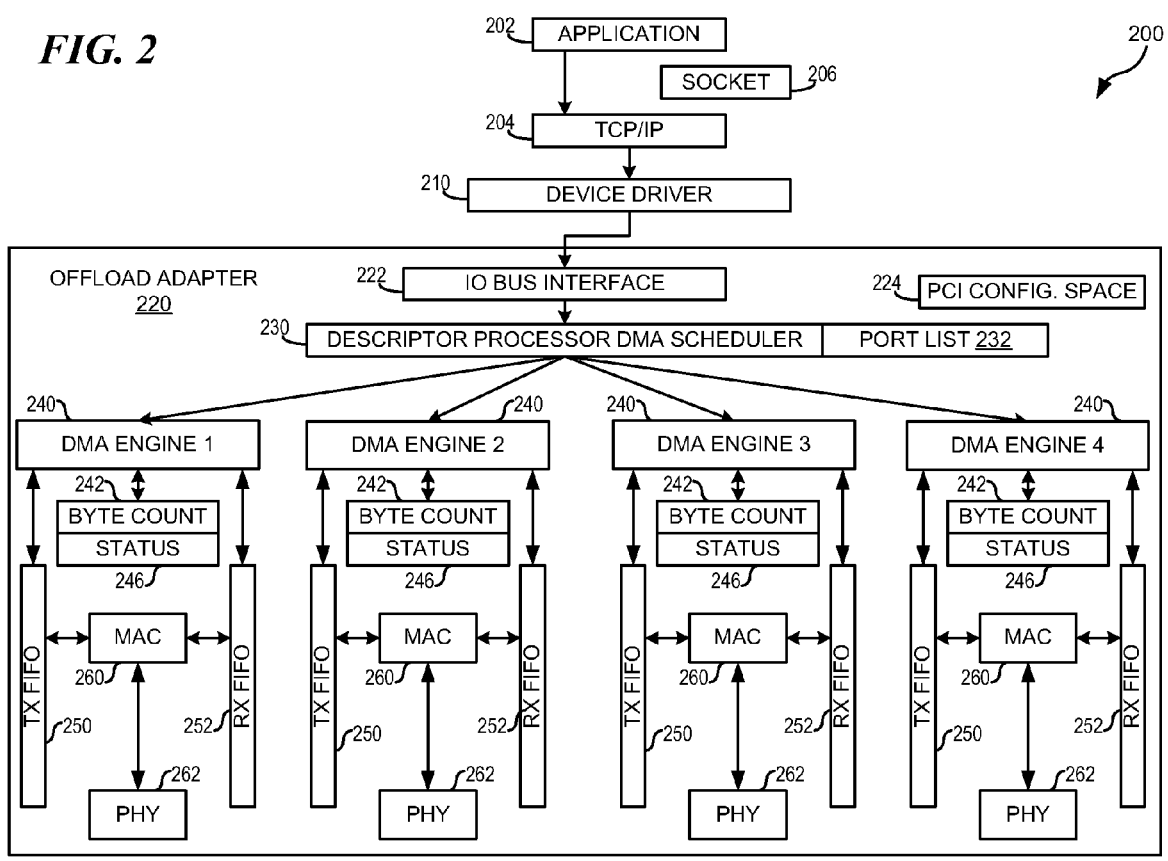
FIG. 2 illustrates a block diagram showing an improved Ethernet load balancing system in accordance with a preferred embodiment.

Referring now to the drawings, FIG. 2 is a high-level block diagram illustrating certain components of a system 200 for improved Ethernet load balancing, in accordance with a preferred embodiment of the present invention. System 200 comprises a device driver 210.

Device driver 210 is an otherwise conventional network device driver, modified as described below. More specifically, application (or application layer) 202 transmits an addressed packet, for transmission to the network, to TCP/IP layer interface 204, of socket 206. TCP/IP interface 204 passes the addressed packet to device driver 210. Thus far, system 200 operates much like a typical EtherChannel system. Device driver 210, however, does not include any EtherChannel functionality. Instead, offload adapter 220 performs the EtherChannel functionality, among other things. Device driver 210 passes the received packet (i.e., a "transmission packet" or "TX packet") to offload adapter 220. For incoming packets, device driver 210 receives packets from the network (i.e., "received packets" or "RX packets") from offload adapter 220.

Offload adapter 220 therefore, generally, selects one of the several available Ethernet "ports," and passes the addressed packet to the selected port for further processing and transmission over the network. More particularly, offload adapter 220 includes IO bus interface 222. IO bus interface 222 couples to device driver 210 along a system bus. Generally, IO bus interface 222 is an otherwise conventional bus interface, and receives TX packets from device driver 210. IO bus interface 222 also transmits RX packets, packets received from other network devices, to device driver 210.

Offload adapter 220 also includes PCI configuration space 224. Generally PCI configuration space 224 is an otherwise conventional configuration space for a peripheral component interconnect (PCI) bus standard. One skilled in the art will understand that PCI configuration space 224 includes a variety of standardized information and settings related to the PCI and other bus protocol standards. In one embodiment, PCI configuration space 224 stores the general Ethernet settings for system 200.

Offload adapter 220 includes a plurality of ports, each port comprising a DMA engine 240, a byte count register 242, a status register 244, a transmit packet queue (TX FIFO ("first in first out")) 250, a receive queue (RX FIFO) 252, a MAC (Media Access Control) layer 260, and a PHY (Physical) layer 262. One skilled in the art will recognize in each port DMA engine 240, TX FIFO 250, RX FIFO 252, MAC 260, and PHY 262 as otherwise conventional Ethernet adapter components. Each of these otherwise conventional Ethernet adapter components operates according to the Ethernet/EtherChannel standard, except as otherwise described below. In the illustrated embodiment, system 200 includes four ports. One skilled in the art will understand that system 200 can also include two, six, eight, or other suitable number of ports.

As described above, each port also includes a byte count register 242 and a status register 244. Byte count register 242 and status register 244 couple to DMA engine 240 and are otherwise conventional registers. Byte count register 242 stores a count of the number of bytes currently pending in the port for transfer (a "byte count"). Byte count register 242 increments when its associated port 240 receives a new packet for transmission, and decrements when the associated port 240 completes transmission to the network.

Status register 244 stores an indication of the current status of the associated port, including an indication of "working" or "not working" (a "status"). In one embodiment, status register 244 comprises a single latch, which stores a logic zero when the associated port is "not working," and which stores a logic one when the associated port is "working." As used herein, "working" generally means operational or otherwise capable of performing the tasks assigned to the device in question. In an alternate embodiment, status register 244 is an extension of byte count register 242.

Offload adapter 220 also includes descriptor processor and DMA scheduler (DPDS) 230, which couples to IO bus interface 222 and each port's DMA engine 240. DPDS 230 is an otherwise conventional DMA scheduler, modified as described below. In a preferred embodiment, DPDS 230 comprises hardware logic. In an alternate embodiment, DPDS 230 can be implemented as a software component of IO bus interface 222. DPDS 230 includes and maintains a port list 232.

In one embodiment, port list 232 comprises a list of the currently "working" ports of offload adapter 220. In an alternate embodiment, port list 232 comprises a list of the currently "not working" ports of offload adapter 220. Generally, in operation, DPDS 230 assigns TX packets to the least busy of the plurality of ports, based on the status and byte count registers 242/244, with reference to working port list 232. More particularly, DPDS 230 operates as described with reference to FIG. 3.

FIG. 3 illustrates one embodiment of a method for Ethernet load balancing. Specifically, FIG. 3 illustrates a high-level flow chart 300 that depicts logical operational steps performed by, for example, system 200 of FIG. 2, which may be implemented in accordance with a preferred embodiment. Generally, DPDS 230 performs the steps of the method, unless indicated otherwise.

As indicated at block 305, the process begins, wherein system 200 receives a packet. For example, system 200 can receive an RX packet from the network, or a TX packet from application layer 202. Next, as illustrated at block 310, offload adapter 220 determines whether the received packet includes a TX descriptor that requires processing.

If at block 310 the received packet does not include a TX descriptor that requires processing, the process continues along the NO branch to block 315. For example, an RX packet received from the network does not typically require processing. Additionally, certain received packets can include a TX descriptor that does not require processing. Next, at block 315, system 200 waits until another packet is received, as indicated at block 305.

If at block 310 the received packet includes a TX descriptor that requires processing, the process continues along the YES branch to block 320. Next, as indicated at block 320, the system identifies the least busy port from among the working ports. Specifically, in one embodiment DPDS 230 accesses the byte count register 242 for each port listed in the port list 232, and identifies the port with the lowest byte count. This port is the "identified port" or "least busy port". In an alternate embodiment, the "least busy port" is a port with a byte count below a predetermined threshold.

Next, as illustrated at decisional block 325, DPDS 230 determines whether the identified port is in "working" status. Specifically, DPDS 230 accesses the status register 242 for the identified port to determine the status of the port. If at block 325 the identified port is not in "working" status, the process continues along the NO branch to block 330. As indicated at block 330, DPDS 230 updates port list 232 to remove the identified port.

As described above, port list 232 includes a list of all ports of offload adapter 220 that have a "working" status. In an alternate embodiment, port list 232 instead includes a list of all ports of offload adapter 220 that have a "not working" status. In that embodiment, at block 320, DPDS 230 accesses the byte count register 242 for each port not listed in port list 232, to identify the port with the lowest byte count. Also in that embodiment, at block 330, DPDS 230 updates the working port list 232 to add the identified port.

In either embodiment, whether a "working port list" or a "not working port list", the process continues as indicated at decisional block 335, wherein DPDS 230 determines whether there are additional working ports in offload adapter 220. If at block 335 there are no additional working ports in offload adapter 220, the process continues along the NO branch to block 340. Next, at block 340, system 200 generates an error notification and the process ends.

If at block 335 there are additional working ports in offload adapter 220, the process continues along the YES branch, returning to block 320, wherein DPDS 230 identifies the least busy of the working ports, based on the byte count registers 242 and the port list 232, as described above.

If at block 325 the identified port is in "working" status, the process continues along the YES branch to block 345. Next, as illustrated at block 345, DPDS 230 assigns the TX packet to the identified port for transmission, and the TX packet is transmitted normally.

Next, as illustrated at block 350, system 200 increments the byte count on the byte count register 242 of the identified port. In one embodiment, the identified port's DMA engine 240 increments and decrements the byte count register 242. In an alternate embodiment, DPDS 230 increments the byte count registers 242, and each individual port decrements its associated byte count register 242. In an alternate embodiment, DPDS 230 increments and decrements the byte count registers 242.

Next, the process continues to block 315, wherein the system 200 waits to receive a packet from the network, as indicated at block 305, and described above.

Thus, generally, system 200 adds hardware logic to multiport Ethernet adapters that routes the transmit packets to the least busy port for transmission. So configured, a driver and/or operating system (OS) sees the multiport Ethernet adapter as a single port and configures it as a single function device/adapter. As shown, offload adapter 220 balances the load between the ports as described above. When a port is down for any reason, offload adapter 220 updates the ports status register 244, and DPDS 230 will stop and/or skip sending any more transmit packets to that port until it becomes operational again, as indicated by the status register 244.

Accordingly, the disclosed embodiments provide numerous advantages over other methods and systems. For example, the current configuration allows the system OS (operating system) to eliminate one software layer (i.e., the EtherChannel driver) on the main transmit and receive path, which improves the packet latency and reduces the CPU usage of the system. The disclosed embodiments also balance traffic between the ports and improve the overall packet throughput.

Further, the disclosed embodiments offer methods to implement EtherChannel functionality on multiport adapters, which eliminates and/or reduces the software locking issue, and eliminates one layer on the software stack. So configured, with the EtherChannel function resident on the offload adapter, system 200 experiences improved scaling, latency, and throughput. System 200 also experiences improved error recovery and detection of port errors.

It will be appreciated that variations of the above-disclosed and other features and functions, or alternatives thereof, may be desirably combined into many other different systems or applications. Additionally, various presently unforeseen or unanticipated alternatives, modifications, variations or improvements therein may be subsequently made by those skilled in the art, which are also intended to be encompassed by the following claims.

What is claimed is:

1. A method for Ethernet packet load balancing, comprising:
   receiving a transmit packet for transmission on an Ethernet network;
   identifying a least busy port from a plurality of ports indicated in a port list based on a byte count associated with each of the plurality of ports;
   determining whether the identified least busy port is in a working status;
   if the identified least busy port is in a working status:
      assigning the transmit packet to the identified least busy port; and
      incrementing the byte count associated with the identified least busy port; and
   if the identified least busy port is not in a working status:
      updating the port list; and
      based on a determination that there are additional working ports, assigning the transmit packet to one of the additional working ports.

2. The method of claim 1, wherein identifying a least busy port comprises accessing a byte count.

3. The method of claim 1, wherein determining whether the identified least busy port comprises accessing a status register.

4. The method of claim 1, wherein the port list comprises a list of ports having a working status.

5. The method of claim 1, wherein the port list comprises a list of ports having a not working status.

6. The method of claim 1, wherein the least busy port is the port with a lowest byte count.

7. The method of claim 1, wherein the least busy port is a port with a byte count below a predetermined threshold.

8. A system for Ethernet load balancing, comprising:
   a bus interface configured to couple to a device driver and to receive transmit packets for transmission over an Ethernet network;
   a descriptor processor direct memory access (DMA) scheduler (DPDS) coupled to the bus interface and comprising a port list;
   a plurality of Ethernet ports coupled to the DPDS, each Ethernet port comprising:
      a status register indicating a "working" or "not working" status for an associated port; and
      a byte count register indicating a byte count for the associated port; and
   wherein the DPDS assigns received transmit packets to a least busy port of the plurality of ports for transmission based the port list and the byte count of the associated ports; and wherein the DPDS is configured to:
   determine whether an identified least busy port is in a working status;
   if the identified least busy port is in a working status:
      assign the transmit packet to the identified least busy port; and
      increment the byte count associated with the identified least busy port; and
   if the identified least busy port is not in a working status:
      update the port list; and
      based on a determination that there are additional working ports, assign the transmit packet to one of the additional working ports.

9. The system of claim 8, wherein the status register comprises a single latch.

10. The system of claim 8, wherein the port list comprises a list of ports having a working status.

11. The system of claim 8, wherein the port list comprises a list of ports having a not working status.

12. The system of claim 8, wherein the least busy port is the port with a lowest byte count.

13. The system of claim 8, wherein the least busy port is a port with a byte count below a predetermined threshold.

14. The system of claim 8, wherein the DPDS updates the byte count of a port based on transmit packets assigned to that port.

15. The system of claim 8, wherein each port updates the byte count of the port based on transmit packets assigned to that port.

16. A processor comprising a computer program product for Ethernet packet load balancing, the computer program product having a non-transitory computer-readable medium with a computer program embodied thereon, the computer program comprising:
   computer code for receiving a transmit packet for transmission on an Ethernet network;
   computer code for identifying a least busy port from a plurality of ports indicated in a port list based on a byte count associated with each of the plurality of ports;
   computer code for determining whether the identified least busy port is in a working status;
   computer code for, if the identified least busy port is in a working status:
      assigning the transmit packet to the identified least busy port; and
      incrementing the byte count associated with the identified least busy port; and computer code for, if the identified least busy port is not in a working status:
  updating the port list; and
  based on a determination that there are additional working ports, assigning the transmit packet to one of the additional working ports.

17. The processor of claim 16, wherein identifying a least busy port comprises accessing a byte count and wherein determining whether the identified least busy port comprises accessing a status register.

18. The processor of claim 16, wherein the port list comprises a list of ports having a working status.

19. The processor of claim 16, wherein the port list comprises a list of ports having a not working status.

20. The processor of claim 16, wherein the least busy port is the port with a lowest byte count.

* * * * *